(12) United States Patent
Suri et al.

(10) Patent No.: US 12,639,009 B1
(45) Date of Patent: May 26, 2026

(54) QUALITY OF SERVICE-ENABLED STORAGE CONTROLLER

(71) Applicant: Marvell Asia Pte Ltd, Singapore (SG)

(72) Inventors: Salil Suri, Fremont, CA (US); Kalyan Prabhu Gonar, Mountain House, CA (US)

(73) Assignee: Marvell Asia Pte Ltd, Singapore (SG)

( * ) Notice: Subject to any disclaimer, the term of this patent is extended or adjusted under 35 U.S.C. 154(b) by 51 days.

(21) Appl. No.: 18/658,825

(22) Filed: May 8, 2024

Related U.S. Application Data

(60) Provisional application No. 63/465,207, filed on May 9, 2023.

(51) Int. Cl.
*G06F 3/06* (2006.01)

(52) U.S. Cl.
CPC .......... *G06F 3/0659* (2013.01); *G06F 3/0604* (2013.01); *G06F 3/067* (2013.01)

(58) Field of Classification Search
CPC ....... G06F 3/0659; G06F 3/0604; G06F 3/067
See application file for complete search history.

(56) References Cited

U.S. PATENT DOCUMENTS

| | | | |
|---|---|---|---|
| 2018/0189104 A1* | 7/2018 | Agarwal | G06F 9/455 |
| 2018/0217951 A1* | 8/2018 | Benisty | G06F 13/1642 |
| 2020/0089537 A1* | 3/2020 | Bahirat | G06F 9/468 |
| 2022/0035565 A1* | 2/2022 | Ki | G06F 3/0604 |
| 2022/0164281 A1* | 5/2022 | Coleman | G06F 3/0647 |
| 2022/0413708 A1* | 12/2022 | Canepa | G06F 3/0611 |

* cited by examiner

*Primary Examiner* — Henry Tsai
*Assistant Examiner* — Harry Z Wang
(74) *Attorney, Agent, or Firm* — Colby Nipper PLLC

(57) ABSTRACT

The present disclosure describes apparatuses and techniques for implementing a Quality of Service-enabled (QoS-enabled) storage controller. In various aspects, a QoS manager of a storage controller or hardware accelerator can implement credit-based policies for servicing inbound input/ output (I/O) commands of a host. In some cases, the QoS manager implements a queue-based credit policy or function-based credit policy to manage traffic across host submission queues or functions of the storage controller. In a data phase of command processing, the QoS manager may segment or chunk an I/O command based on a size threshold to provide I/O command segments of similar amounts of respective data for processing by a direct memory access (DMA) engine of the storage controller. By so doing, the QoS manager can manage entity-based data traffic such that no entity within or associated with the storage controller exceeds its allocated bandwidth.

20 Claims, 12 Drawing Sheets

100

102

200 —

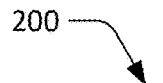

| Host  202 |
| --- |
| Compute Resources  204 |

System Memory  118

| SQ-0 120-0 | SQ-1 120-1 | SQ-2 120-2 | SQ-3 120-3 | . . . . . | SQ-n 120-n |
| --- | --- | --- | --- | --- | --- |

Universal Command Delivery Host Layer  206

| Inbound Queues  128 | Outbound Queues  208 |
| --- | --- |

| DMA Engine 130 | QoS Manager 132 | QoS Parameters 134 | I/O Processing System 210 |
| --- | --- | --- | --- |

Storage Media Controller  122

SSD Controller  212-0

| NAND | NAND |
| --- | --- |
| NAND | NAND |
| NAND | NAND |
| NAND | NAND |

Channel A
214-1

Channel D
214-4

Solid-State Drive  126-0

SSD Controller  212-n

| NAND | NAND |
| --- | --- |
| NAND | NAND |
| NAND | NAND |
| NAND | NAND |

Channel A
212-1

Channel D
214-4

Solid-State Drive  126-n

Submission
Queues
120

Inbound
Queue
128

Outbound
Queue
208

QoS Manager                                    132

Credit Counter                                 302

I/O Processing
Architecture
208

QoS Parameters                                 134

Command QoS Policies                           304

Queue-Based Credit Policy          308

Function-Based Credit Policy       310

Data QoS Policies                              306

Chunk-Based Algorithm              312

Limit Unused Bandwidth             314

Distribute Unused Bandwidth        316

DMA
Engine
130

700 —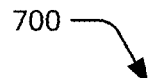

Determine that a submission queue holds an I/O command
702

Determine a credit balance of the submission queue
704

Compare a credit cost of the I/O command with
the credit balance of the submission queue
706

Prevent the I/O command from
moving from the submission
queue to an inbound queue
708

Allow the I/O command to
move from the submission
queue to the inbound queue
710

Decrement the credit balance of the
submission queue by the credit cost
of the I/O command
712

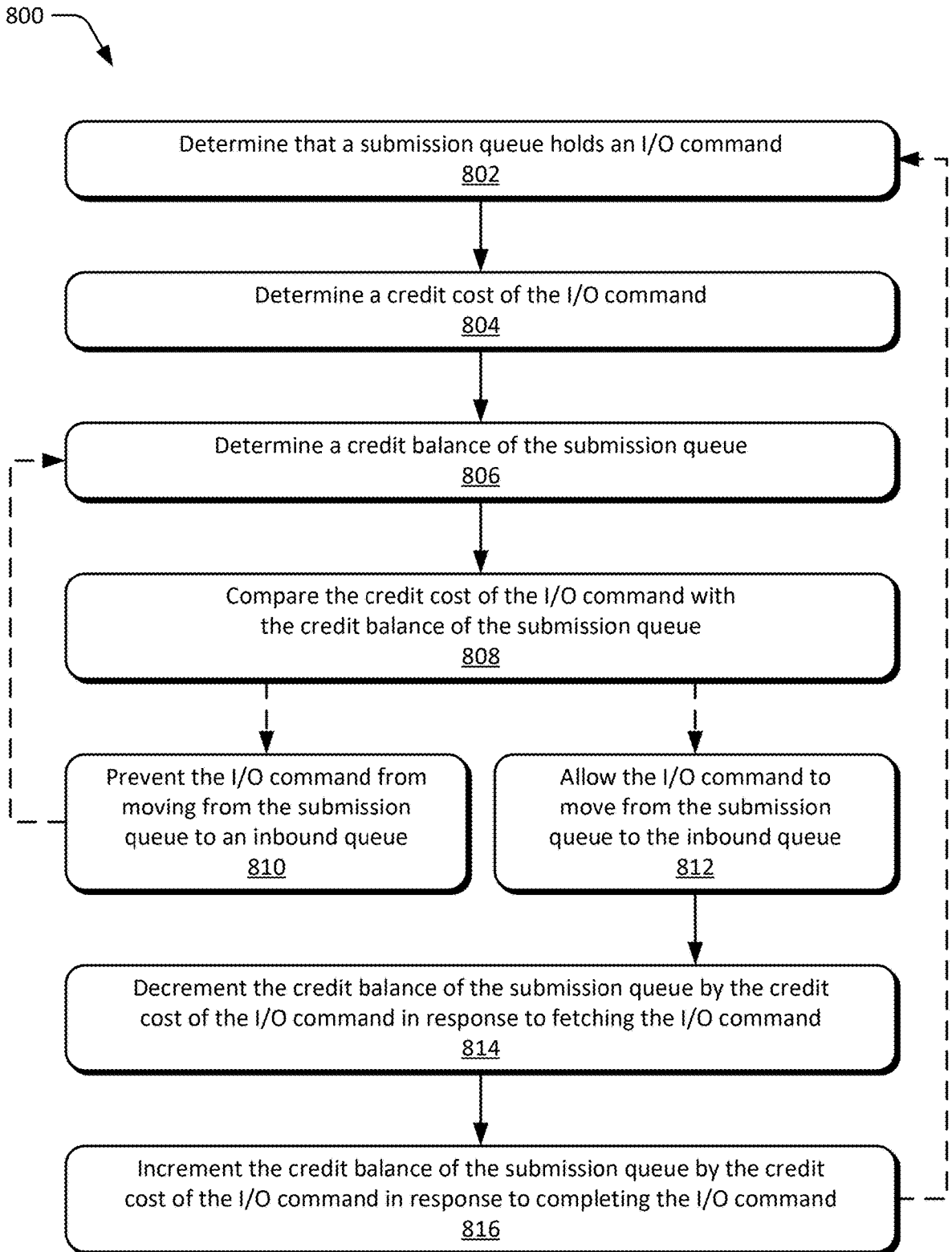

Determine that a submission queue holds an I/O command
802

Determine a credit cost of the I/O command
804

Determine a credit balance of the submission queue
806

Compare the credit cost of the I/O command with
the credit balance of the submission queue
808

Prevent the I/O command from
moving from the submission
queue to an inbound queue
810

Allow the I/O command to
move from the submission
queue to the inbound queue
812

Decrement the credit balance of the submission queue by the credit
cost of the I/O command in response to fetching the I/O command
814

Increment the credit balance of the submission queue by the credit
cost of the I/O command in response to completing the I/O command
816

Fig. 8

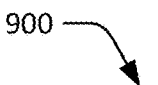

900

Segment an I/O command based on a predefined
sizing parameter to provide I/O command segments
902

Associate the I/O command segments with an identifier of the I/O command
904

Designate a first I/O command segment as an initial
I/O command segment of the multiple I/O command segments
906

Designate a second I/O command segment as an intermediate
I/O command segment of the multiple I/O command segments
908

Designate a third I/O command segment as a final
I/O command segment of the multiple I/O segments
910

Provide the multiple I/O command segments to a
direct memory access engine based on a QoS policy
912

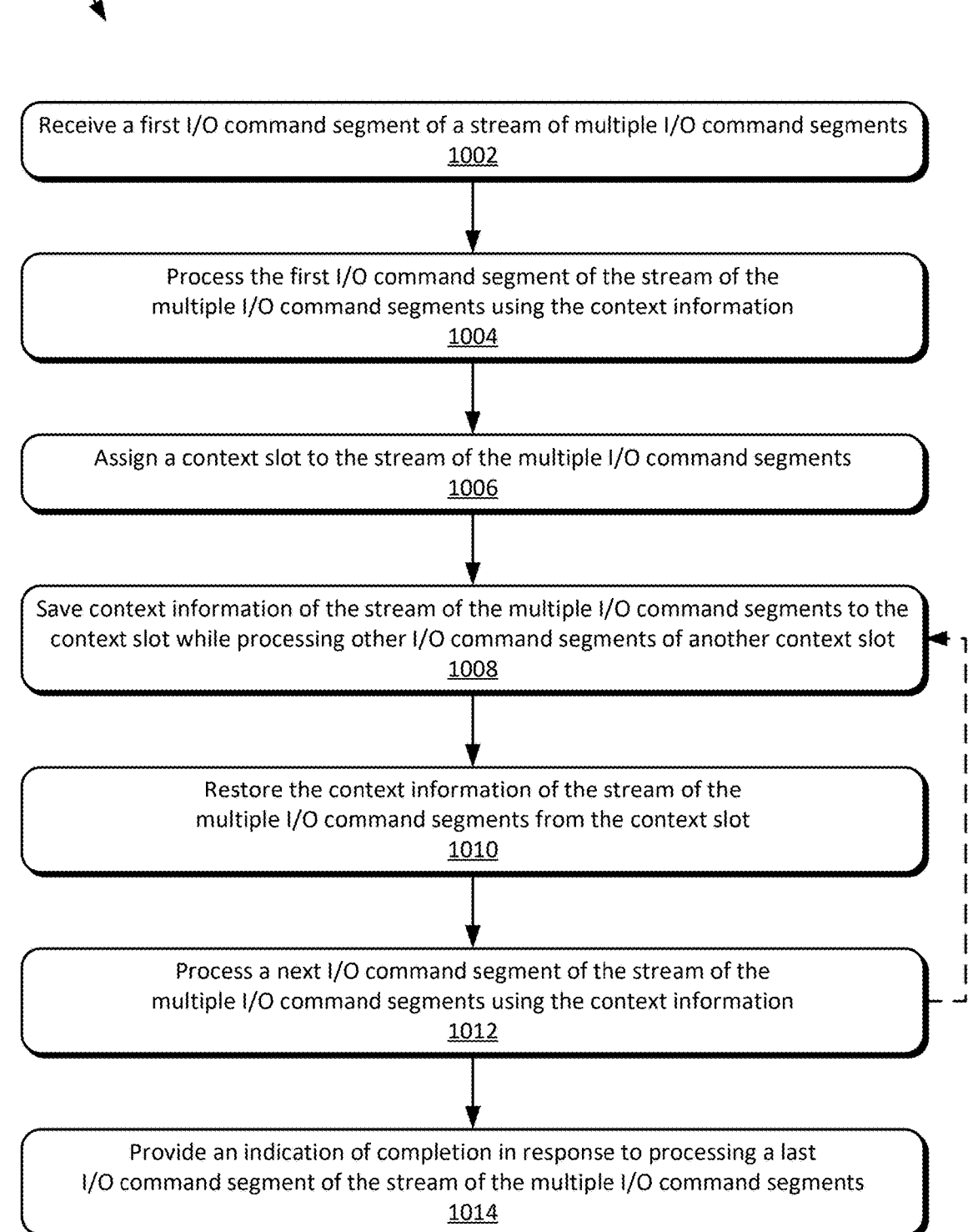

Receive a first I/O command segment of a stream of multiple I/O command segments
1002

Process the first I/O command segment of the stream of the
multiple I/O command segments using the context information
1004

Assign a context slot to the stream of the multiple I/O command segments
1006

Save context information of the stream of the multiple I/O command segments to the
context slot while processing other I/O command segments of another context slot
1008

Restore the context information of the stream of the
multiple I/O command segments from the context slot
1010

Process a next I/O command segment of the stream of the
multiple I/O command segments using the context information
1012

Provide an indication of completion in response to processing a last
I/O command segment of the stream of the multiple I/O command segments
1014

Fig. 10

QUALITY OF SERVICE-ENABLED STORAGE CONTROLLER

CROSS REFERENCE TO RELATED APPLICATION

This present disclosure claims priority to U.S. Provisional Patent Application Ser. No. 63/465,207 filed May 9, 2023, the disclosure of which is incorporated by reference herein in its entirety.

BACKGROUND

Large-scale software deployments and cloud services are often implemented through single-tenant or multi-tenant architectures, which can provide scalability, cost, and security benefits through common systems running on shared resources. Generally, in a multi-tenant system, a single instance of a software application and associated hardware infrastructure can serve multiple tenants or clients that share the software application, related data sources, and underlying hardware infrastructure. As such, the multiple tenants of a data center or cloud may concurrently access various compute resources (e.g., processors and memory), network resources, and storage resources through a hypervisor that exposes these resources for use by the software tenants of the data center or cloud.

Resource access through a hypervisor or other software layers, however, can be complex and difficult to implement in a way to ensure that the access provided satisfies different service level requirements of each tenant. For example, some enterprise-level tenants may require high priority and high bandwidth access to storage resources while other consumer-level tenants have lower requirements for priority, bandwidth, or latency for storage resource access. With advances in storage aggregation and scaling (e.g., non-dedicated storage devices), the hypervisor may have difficulties in isolating or prioritizing respective tenant access into the aggregated storage resources. In such cases, an active tenant may saturate the aggregated storage resources with numerous data access requests, which can delay or prevent access by the other tenants to the aggregated storage resources. Accordingly, hypervisors or other host software are often unable to provide respective access to aggregated storage resources in compliance with the different service level requirements of each tenant of a data center or cloud system.

SUMMARY

This summary is provided to introduce subject matter that is further described in the Detailed Description and Drawings. Accordingly, this Summary should not be considered to describe essential features nor used to limit the scope of the claimed subject matter.

In some aspects, a method for providing Quality of Service (QoS) for storage media access includes determining, by a storage media controller, that a submission queue of a host holds an input/output (I/O) command for data access to storage media associated with the storage media controller. The method determines a credit balance of the submission queue by accessing a credit counter associated with the submission queue and compares a credit cost of the I/O command with the credit balance of the submission queue. In response to the credit cost of the I/O command exceeding the credit balance of the submission queue, the method prevents the I/O command from moving from the submission queue to an inbound queue of the storage media controller. Alternatively, in response to the credit cost of the I/O command not exceeding the credit balance of the submission queue, the method allows the I/O command to move from the submission queue to the inbound queue of the storage media controller.

In other aspects, a storage media controller includes an interface configured to enable access to a submission queue of a host, an inbound queue configured to store I/O commands for access to storage media associated with the storage media controller, and a credit counter configured to store a credit balance of the submission queue. The storage media controller also includes a QoS manager configured to determine that the submission queue holds an I/O command for data access to the storage media and compare a credit cost of the I/O command with the credit balance of the submission queue. In response to the credit cost of the I/O command exceeding the credit balance of the submission queue, the storage media controller prevents the I/O command from moving from the submission queue to an inbound queue. Alternatively, in response to the credit cost of the I/O command not exceeding the credit balance of the submission queue, the storage media controller allows the I/O command to move from the submission queue to the inbound queue.

In yet other aspects, an apparatus includes an interface configured to enable access to a submission queue of a host and an inbound queue configured to store I/O commands for access to storage media associated with the apparatus. The apparatus also includes means for maintaining a credit balance of the submission queue, means for determining that the submission queue holds an I/O command for data access to the storage media, and means for comparing a credit cost for the I/O command with the credit balance of the submission queue. In some cases, means of the apparatus prevent the I/O command from moving from the submission queue to an inbound queue in response to the credit cost of the I/O command exceeding the credit balance of the submission queue or allow the I/O command to move from the submission queue to the inbound queue in response to the credit cost of the I/O command not exceeding the credit balance of the submission queue.

The details of one or more implementations of a QoS-enabled storage controller are set forth in the accompanying drawings and the following description. Other features and advantages will be apparent from the description and drawings, and from the claims.

BRIEF DESCRIPTION OF THE DRAWINGS

The details of one or more implementations of a QoS-enabled storage controller are set forth in the accompanying figures and the detailed description below. In the figures, the left-most digit of a reference number identifies the figure in which the reference number first appears. The use of the same reference numbers in different instances in the description and the figures may indicate like elements:

FIG. 2 illustrates an example system in which aspects of a QoS-enabled storage controller can be implemented;

FIG. 7 depicts an example method implementing credit-based QoS in a storage media controller or hardware accelerator;

FIG. 8 depicts an example method for managing I/O command traffic with a credit-based QoS policy;

FIG. 9 depicts an example method for segmenting I/O command based on a size threshold to provide I/O command segments for a DMA engine;

FIG. 10 depicts an example method for processing I/O command segments with a DMA engine;

DETAILED DESCRIPTION

Figure 1:
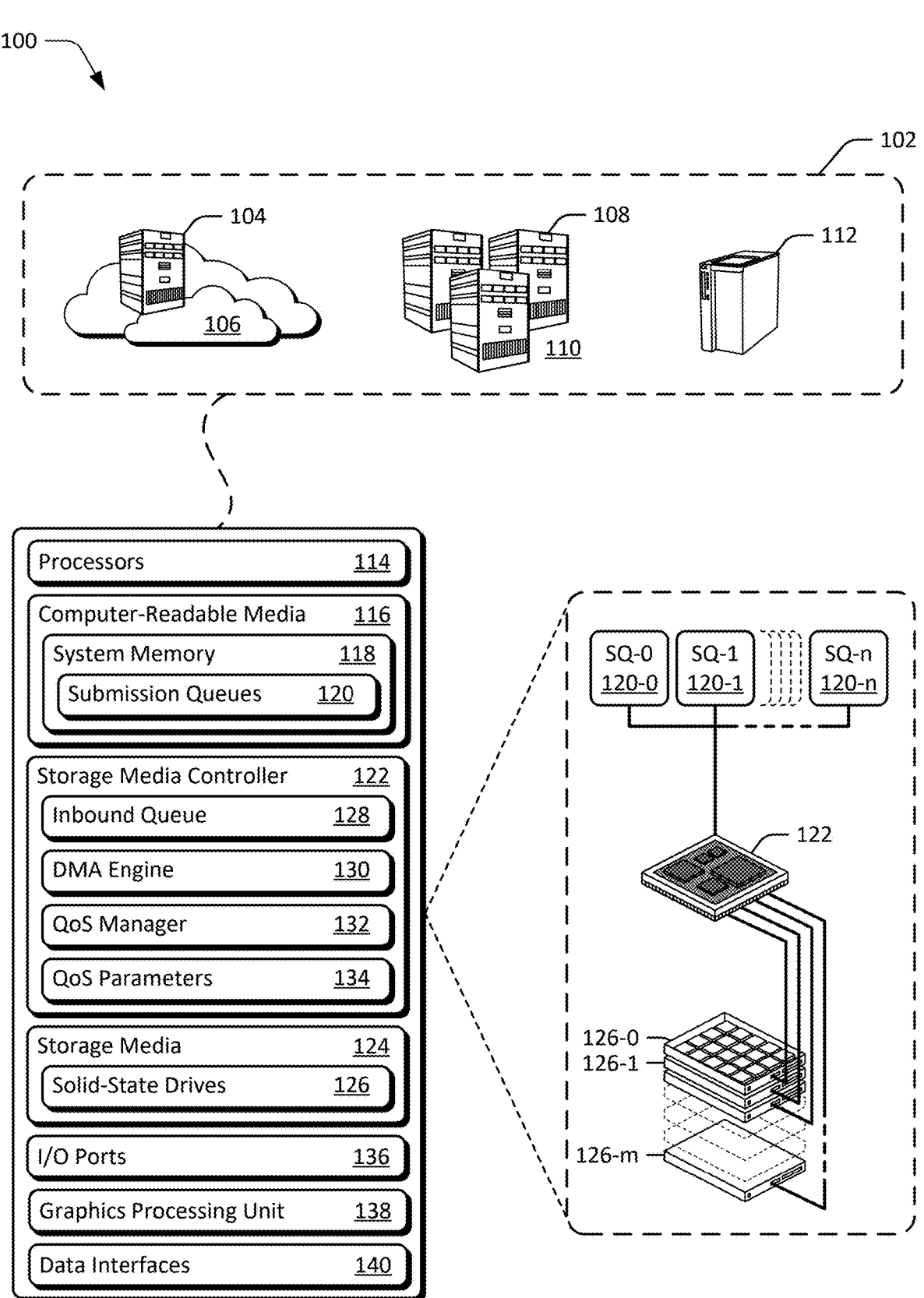
FIG. 1 illustrates an example operating environment having devices in which aspects of a QoS-enabled storage controller can be implemented in accordance with one or more aspects.

In preceding queue management techniques implemented by an NVMe controller, submission queue (SQ) entries submitted by a host (e.g., I/O commands) were fetched from host SQs by the NVMe controller in adherence to a static arbitration scheme. Although such arbitration schemes offer a mechanism to prioritize certain queues over other queues in terms of the queue fetching order, there are notable shortcomings in such queue management policies. For example, to minimize I/O execution latency, SQ entries are typically prefetched from the SQs located in host memory and stored in the internal memory of the controller. Due to limited memory capacity on controller chips, however, this may result in oversubscribing and on-chip congestion. Generally, the preceding arbitration schemes do not help in preventing this congestion and other queue management schemes provide only a very coarse way of controlling command fetches from queues. These schemes usually involve disabling a particular queue when its allocated bandwidth is exceeded to prevent any new command fetches, and reenabling the queue when a fresh QoS command arbitration window starts such that new commands can be fetched. The preceding scheme also has a drawback in that an on-chip central processing unit (CPU) of the controller manages the disabling and the enabling of individual queues which take valuable CPU cycles to execute. Thus, the preceding techniques of queue management are inefficient and consume CPU cycles to implement, which may result in on-chip congestion, delayed execution of other instructions, or excess power consumption.

In contrast with the preceding techniques, this disclosure describes various aspects of a quality of service-enabled (QoS-enabled) storage controller, which may include methods for credit-based command and data QoS with block-size aware latency management. Aspects of a QoS-enabled storage controller may include an apparatus and/or methods for credit-based NVMe command and data QoS with input/output (I/O) block-size aware latency management. Alternatively or additionally, the aspects may utilize other parameters by which to manage command or data flow, such as block-size aware latency management, block-size aware throughput management, or any combination thereof. Generally, the described aspects of QoS and associated QoS policies may be implemented in an NVMe storage device or hardware accelerator to manage entity-based data traffic such that no entity within or associated with a system exceeds its allocated bandwidth. In the context of the disclosure, an entity may reference an NVMe queue, a host submission queue, an NVMe Namespace, a virtual function, or the like. In various aspects, the QoS involves traffic management for both phases of an I/O operation, which include command and data phases of traffic through the storage controller (or hardware accelerator).

In aspects, a QoS-enabled storage controller can implement command QoS that manages, via the controller's QoS layer, fetching of SQ commands from host SQs. For example, a storage media controller of a device may implement a credit-based queue throttling mechanism that allows the device's QoS layer to control the fetching of SQ elements from the host SQs in hardware without the on-chip CPU of the controller. Thus, the aspects described herein may enable more efficient operation of the controller or device by not consuming CPU cycles to manage queue interaction between the controller and the host. Example credit policy options include a queue-based credit policy and a function-based credit policy. In a queue-based credit policy, a per host inbound queue credit-based fetching scheme can be enabled to provide programmable controls that limit, restrict, or manage the number of commands that are prefetched per queue. In a function-based credit policy, a per host function credit-based fetching scheme can be enabled to provide programmable controls to limit, restrict, or manage the number of commands that are prefetched across all queues allocated to a particular host physical function or host virtual function. Generally, a credit counter may be decremented whenever a host SQ element is fetched from the SQ associated with an entity. Once the credit value for a queue (or function) has been exhausted, the QoS manager of the controller may prevent the queue or function from participating in the NVMe arbitration process until its credits (e.g., credit allotment or allowance) is replenished, which may be performed using any suitable method. For example, hardware can auto-replenish the credit for an inbound SQ while processing a command completion that is associated with that queue. This can be implemented by setting the credit increment field in the outbound structure upon completion of an I/O. In other cases, firmware can replenish credit anytime by writing directly to the credit register of the entity or queue (e.g., altering QoS parameters).

In some aspects, the QoS-enabled storage controller implements data QoS that manages a data phase (e.g., data QoS) of the I/O processing cycle. The described aspects may manage (fairly or evenly) the data phase associated with commands sourced from multiple queues such that all queues can achieve their allocated bandwidth with minimum latency and without any wastage of the allocated bandwidth. In preceding NVMe queue management schemes, the NVMe devices faced multiple challenges in managing this data portion of the QoS policy. For example, token bucket algorithms used to regulate data traffic and pre-configured user defined values were employed to determine the amount of data traffic allowed per entity (i.e., queue, namespace or virtual machine (VM)) at any given moment of time.

Because NVMe commands are of varying data transfer lengths (e.g., typically 4 KiB to 2 MiB), and breaking NVMe commands into smaller transfer lengths to exactly fit the remaining bandwidth allocation within a QoS arbitration window can be difficult and inefficient. Thus, algorithms running on firmware (FW) or hardware (HW) determine when a command can be serviced based on its data transfer length and the bandwidth allocation to an entity within the current QoS window. As such, the preceding scheme would submit a command to the data channel only after determining that the transfer length of the command met the bandwidth allocation criteria. When the transfer length of the command exceeded the criteria threshold, then subsequent commands from the same entity would be degraded in terms of priority or completely held back to offer fairness until the next arbitration cycle initiates and the tokens are replenished. This scheme often lead to the undesired behavior of exceeding the quota in the current QoS window and wasted bandwidth in the next QoS window. The preceding schemes also fail to address latency challenges where smaller data block sizes (e.g., 4 KiB) associated with one entity are delayed if a larger data block size (e.g., 256 KiB) from a different entity is being serviced by the data channel ahead of it.

As described herein, aspects of a QoS-enabled storage controller enable QoS features that can provide a "chunk" or segment based data QoS mechanism in which data transfers from multiple entities can be managed based on credits that are multiples of the chunk or segment size (e.g., 4-32 KiB). In such implementations, a QoS manager of the controller, such as a firmware-based data QoS algorithm running on an on-chip CPU) can break, segment, or partition an I/O command (e.g., NVMe command) into multiple chunks (uniform or non-uniform) and then submit chunk (or segmented) commands in a weighted fashion (e.g., weighted-round robin (WRR)) to a DMA engine that is designed or pre-configured to manage simultaneous data streams of chunks or segments associated with multiple entities. The DMA engine may then transfer data chunks in the same order in which the chunk commands were submitted to it by the QoS manager or I/O processing path of the storage controller. In some aspects, hardware storage slots are used to store context information needed to execute all of the chunks, segments, or blocks of a particular command and can be provisioned for a maximum number of entities being supported by the storage controller or device. Generally, a context slot can be assigned while processing a first chunk of a new command and may be released while processing a last chunk of a command. During a data context switch, the context information of a current chunk or segment can be saved to its associated slot and restored from the associated slot to process the next chunk or segment of the command. This mechanism may allow all entities to be serviced uniformly according to a user-defined or pre-defined QoS policy while maintaining QoS parameter (e.g., latency, bandwidth, throughput) fairness between commands with small block sizes (e.g., 4-32 KiB) and large block sizes (e.g., 1-2 MB).

In various aspects, the data QoS schemes may be further tuned to fit different QoS scheduling models, which may include a limit unused bandwidth (LUB) or distribute unused bandwidth (DUB). Under the LUB QoS model, any unused bandwidth allocated to an entity can be wasted by executing idle commands in place of actual commands that transfer data over the data link (e.g., PCIe link). Generally, the idle commands may move an equivalent amount of chunk data (e.g., 4 KiB) between dummy ports internal to the chip and thus provide a higher-precision method for "wasting" allocated bandwidth in terms of time. Under the DUB QoS model, any unused bandwidth allocated to a particular entity may be distributed equally amongst other entities within the system that may have a need to transfer data beyond their allocated quota. These are but a few examples of how a QoS-enabled storage controller can be implemented, others of which are described throughout the disclosure.

The following discussion describes an operating environment, techniques that may be employed in the operating environment, a System-on-Chip (SoC), and a controller in which components of the operating environment can be embodied. In the context of the present disclosure for aspects of a QoS-enabled storage controller, reference is made to the operating environment by way of example only. Operating Environment FIG. 1 illustrates an example operating environment 100 having host devices 102 (referred to simply as a single "host device 102") in which the described aspects of a QoS-enabled storage controller may be implemented. The host device 102 of the operating environment 100 is capable of storing or accessing various forms of data, files, objects, or information. Examples of the host device 102 may include a computing cluster 104 (e.g., of a cloud 106), a server 108 or server hardware of a data center 110, or a server 112 (e.g., standalone), any of which may be configured as part of a storage network, storage service, or cloud system. Further examples of the host devices 102 (not shown) may include a tablet computer, a set-top-box, a data storage appliance, wearable smart-device, television, content-streaming device, high-definition multimedia interface (HDMI) media stick, smart appliance, home automation controller, smart thermostat, Internet-of-Things (IoT) device, mobile-internet device (MID), a network-attached-storage (NAS) drive, aggregate storage system, server blade, gaming console, automotive entertainment device, automotive computing system, automotive control module (e.g., engine or power train control module), and so on. Generally, the host device 102 may communicate or store data for any suitable purpose, such as to enable functionalities of a particular type of device, provide a user interface, enable network access, implement gaming applications, playback media, provide navigation, edit content, provide data storage, or the like.

The host device 102 includes processors 114 and computer-readable storage media 116. The processors 114 may be implemented as any suitable type or number of processors (e.g., x86 or ARM), either single-core or multi-core, for executing instructions or commands of an operating system or other programs of the host device 102. The computer-readable media 116 (CRM 116) includes system memory 118 from which virtual machines (VMs), tenants, or workloads of a host may be executed or implemented. In this example, the system memory 118 also includes host submission queues 120 (host SQs 120), which may correspond to respective VMs, tenants, or workloads of the host. The system memory 118 of the host device 102 may include any suitable type or combination of volatile memory or non-volatile memory. The host SQs 120 (e.g., NVMe SQs) for the VMs or other clients executing on the host 202 can be implemented in the system memory 118 are illustrated here as host SQ-0 120-0 through SQ-n 120-n, where n is any suitable integer. For example, the volatile memory of host devices 102 may include various types of random-access memory (RAM), dynamic RAM (DRAM), static RAM (SRAM) or the like. The non-volatile memory may include read-only memory (ROM), electronically erasable programmable ROM (EEPROM) or Flash memory (e.g., NOR Flash or NAND Flash). These memories, individually or in combination, may store data associated with applications, tenants, workloads, initiators, virtual machines, and/or an operating system of the host device 102.

In this example, the host device 102 includes a QoS-enabled storage media controller 122 (storage media controller 122) and storage media 124, which may be accessed through the storage media controller 122. Although shown as being combined with the host device 102, the storage media controller 122 and/or the storage media 124 may be implemented separately from or remotely from the host device 102. The storage media 124 of the host device 102 may be configured as any suitable type of data storage media, such as a storage device, storage drive, storage array, storage volume, or the like. Although described with reference to the host device 102, the storage media 124 may also be implemented separately as a standalone device or as part of a larger storage collective, such as a data center, server farm, or virtualized storage system (e.g., for cloud-based storage or services). Examples of the storage media 124 include a hard-disk drive (HDD, not shown), an optical-disk drive (not shown), a solid-state drive 126 (SSD 126) or array of m+1 SSDs 126-0 through 126-*m*.

Each of the SSDs 126 includes or is formed from non-volatile memory devices on which data or information of the host device 102 or other sources is stored. The non-volatile memory devices may be implemented with any type or combination of solid-state memory media, such Flash, NAND Flash, NAND memory, RAM, DRAM (e.g., for caching), SRAM, or the like. In some cases, the data stored to the non-volatile memory devices may be organized into files of data (e.g., content) or data objects that are stored to the SSDs 126 and accessed by the host device 102 or tenants, workloads, or initiators of the host device. The types, sizes, or formats of the files may vary depending on a respective source, use, or application associated with the file. For example, the files stored to the SSDs 126 may include audio files, video files, text files, image files, multimedia files, spreadsheets, and so on.

In this example, the storage media controller 122 (or a hardware accelerator) of the host device 102 is capable of supporting virtualization, providing QoS over a virtual interface, implementing virtual functions (e.g., host functions) associated with the storage media 124, or other functions (e.g., cryptography). In aspects, the storage media controller implements Quality of Service (QoS) policies for or in association with storage media 124 (e.g., NVMe storage devices) to manage entity-based data traffic such that no entity within the host system exceeds its allocated bandwidth. In the context of the disclosure, an entity may reference an NVMe Queue, a NVMe Namespace, Virtual Function, or the like. Although not shown, the storage media controller 122 may include a virtual function (VF) address engine and VF mappings information to enable or support aspects of QoS for virtual functions of the host device or host system. In various aspects, the storage media controller 122 includes at least one inbound queue 128, a direct memory access (DMA) engine 130, a Quality of Service (QoS) Manager 132, and QoS parameters 134, each of which may be implemented to perform respective operations or functions for supporting command and/or data management, enabling QoS as described herein, or the like. The implementations and uses of these entities vary and are described throughout this disclosure.

In various aspects, the QoS manager 132 may ensure that service and/or execution of host commands, as well as data movement, is managed to a quality-of-service level or parameter associated with a particular entity, such as an NVMe queue, submission queue, an NVMe namespace, virtual function, of the like. For example, the QoS manager 132 may determine a QoS level or threshold for NVMe queues such that no entity within the system exceeds its allocated bandwidth. The QoS level or QoS parameters 134 set for the NVMe queues may be different from one another or set similarly for multiple ones of the NVMe queues (e.g., by data traffic class or VF types). In aspects, the QoS-enabled storage controller implements a credit-based queue throttling mechanism that allows a QoS layer of the storage controller to control the fetching of SQ Elements from the host submission queues through hardware (e.g., a pure hardware implementation to reduce loading on controller CPUs), such as a queue-based credit policy or a function-based credit policy. The storage controller may also implement data QoS to chunk or segment I/O command operations and fairly allocate processing of I/O command and data operations across multiple host entities. In aspects, the DMA engine 130 may be configured to process the chunks or segments of I/O commands and/or enable QoS features relating to completion of I/O commands or outbound traffic of the controller. These are but a few examples of how a QoS-enabled storage controller can be implemented, others of which are described throughout the disclosure.

The host device 102 may also include I/O ports 136, a graphics processing unit 138 (GPU), and data interfaces 140. Generally, the I/O ports 136 allow a host device 102 to interact with other devices, peripherals, or users. For example, the I/O ports 136 may include or be coupled with a universal serial bus, human interface devices, audio inputs, audio outputs, or the like. The GPU 138 processes and renders graphics-related data for host device 102, such as user interface elements of an operating system, applications, or the like. In some cases, the GPU 138 accesses a portion of local memory to render graphics or includes dedicated memory for rendering graphics (e.g., video RAM) of the host device 102.

The data interfaces 140 of the host device 102 provide connectivity to one or more networks and other devices connected to those networks. The data interfaces 140 may include wired interfaces, such as Ethernet or fiber optic interfaces for communicating over a local network, intranet, or the Internet. Alternately or additionally, the data interfaces 140 may include wireless interfaces that facilitate communication over wireless networks, such as wireless LANs, wide-area wireless networks (e.g., cellular networks), and/or wireless personal-area-networks (WPANs). Any of the data communicated through the I/O ports 136 or the data interfaces 140 may be written to or read from the storage media 124 of the host device 102 in accordance with one or more aspects of this disclosure.

FIG. 2 illustrates at 200 an example system in which aspects of a QoS-enabled storage controller or hardware accelerator can be implemented. The system may represent an architecture for a QoS-enabled storage media controller 122 and SSDs 126 shown in FIG. 1. In this example, the storage media controller 122 is operably coupled between a host 202 and SSDs 126-0 through 126-*n* (collectively "SSDs 126") from which virtualized areas, partitions, or segments of storage are provided. The storage media controller may be coupled to the host 202 and/or the SSDs through one or more respective PCIe interfaces (not shown) that may communicate in compliance with an NVMe protocol (e.g., NVMe rev 1.3, 1.4, 2.0). In various implementations, the host 202 (e.g., a host device 102) may include any suitable number of virtual machines, clients, tenants, workloads, or the like (not shown) that execute on compute resources 204 of the host.

Generally, the compute resources 204 may include respective combinations of processing resources and system memory of the host 202 that are used to execute the applications, virtual machines, tenants, or initiators of the host that access storage and/or functions associated with the storage media controller 122. In this example, the host 202 includes host SQs 120 (e.g., NVMe SQs) in system memory 118 for the VMs or other clients executing on the host 202, and include host SQ-0 120-0 through SQ-n 120-n, where n is any suitable integer. As the tenants or workloads generate I/O commands for storage or other functions, the I/O commands can be placed in respective ones of the SQs 120 assigned to each workload or VM of the host 202.

The storage media controller 122 may enable virtual functions for the storage media and/or provide QoS over virtual functions, namespaces, or the like for solid-state storage in accordance with one or more aspects. In this example, the storage media controller 122 includes a universal command delivery host layer 206 (UCD host layer 206), inbound queues 128, and outbound queues 208 for enabling I/O traffic between the host 202 and the storage media controller 122. The UCD host layer 206 may receive and distribute commands to the inbound queues 128 and the I/O processing system may process the commands and manage the data phase of command execution with other hardware of the controller. After completion, the I/O processing may return the completed commands to the outbound queues 208 for delivery to completion queues (not shown) of the host 202. The storage media controller 122 also includes a DMA engine 130, QoS manager 132, QoS parameters 134, and an I/O processing system 210 through which aspects of QoS may be implemented. Generally, the storage media controller 122 enables access to storage media or functions (e.g., cryptography) associated with the controller through the UCD host layer 206, inbound queues 128, DMA engine 130, and I/O processing system.

In aspects, the functions and queues of the storage media controller 122 enable data movement and/or processing (e.g., encryption) between the tenants, services, applications, system memory 118, or VMs of the host 202 and storage provided by the SSDs 126 or other functions of the controller (not shown). The storage media controller 122 may be implemented with any number and/or combination of physical and virtual functions. A physical function of the storage media controller 122 may be equivalent to one or more functions of a PCIe physical function device. In some cases, the physical functions are responsible for arbitration relating to traffic policy decisions, such as link speed or network addresses in use by the VMs in the case of networking, and for handling various input and output transactions between the storage media controller 122, entities of the host 202, and the SSDs 126.

Generally, entities of the host 202 access services of the storage media controller 122 and/or data stored in the SSDs 126 using commands submitted through respective ones of the host submission queues 120. In some implementations, the storage media controller 122 presents aggregated storage media, such as SSDs 126, as a virtual disk or storage volume to the host 202 or the VMs of the host. In the context of NVMe, this virtual disk may be segmented or partitioned into different areas that are accessed through a namespace. As shown in FIG. 2, each of the SSDs 126 may be implemented with an SSD controller 212-0 through 212-n through which NAND channels 214-1 through 214-4 are accessible. Each channel 214 of NAND (e.g., channel A or NAND channel 214) includes multiple NAND devices, which may be implemented as separate NAND devices or NAND dies of the SSD 126 that are accessible or addressable through a respective NAND channel.

In aspects, the QoS manager 132 and QoS parameters 134 of the storage media controller 122 implement aspects of QoS as described throughout the disclosure to facilitate data access and/or services between the SSDs 126 and host memory. For example, the QoS manager 132 may implement a credit-based queue management mechanism that allows the device's QoS layer to control the fetching of SQ elements from the host SQs purely in hardware. Example credit policy options include a queue-based credit policy and a function-based credit policy as described herein. Alternatively or additionally, the QoS manager 132 may chunk or segment I/O command operations and fairly allocate processing of I/O command and data operations across multiple host entities. By so doing, the QoS manager 132 can manage entity-based data traffic such that no entity within or associated with the storage controller exceeds its allocated bandwidth.

Figure 3:
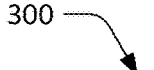
FIG. 3 illustrates an example configuration of QoS manager associated with components of an I/O processing system in accordance with one or more aspects.

FIG. 3 illustrates at 300 an example configuration of QoS manager associated with components of an I/O processing system in accordance with one or more aspects. In various aspects, the QoS manager 132 may be implemented to provide credit-based QoS for storage media access and/or functions of a controller or hardware accelerator. The components and configurations described with reference to FIGS. 3-6 may be implemented to enable other types of virtual interfaces, data processing functions, cryptography, storage media access and the like. In aspects, the QoS manager 132 and components described with reference to FIGS. 3-6 are implemented as a storage controller or hardware accelerator that communicates with a host via an NVMe interface (e.g., an interface configured to enable access to a submission queue of a host), such as an NVMe interface implemented over a x4, x8, or x16 PCIe interface. Alternately or additionally, the host may be connected to the storage controller by an NVMe interface to enable data transactions through the storage controller to the SSDs or other storage.

Generally, the NVMe specification or protocol supports namespace-based access of storage media or SSDs in this example. In aspects of credit-based command and data QoS with block-size aware latency management, the storage controller 122 can map a virtual function of the controller to a namespace for a segment or partition of the virtual disk. By so doing, the QoS manager 132 can provide aspects of QoS using a namespace (or other entities), such that VMs or tenants may subscribe to a level of service for storage access which is administered by a QoS manager of the controller (not shown) through namespace-based access of the storage media. In other words, a client or customer subscribes to a pre-defined amount of bandwidth and is connected to a virtual function on the host or by the host. This virtual function, which is mapped to the namespace within the storage controller, can be allocated bandwidth or access to the storage media or other functions based on a threshold or quota assigned to the namespace, such as in accordance with the subscription for data access at a particular service level. Within an NVMe subsystem of the storage controller, the QoS manager 132 may manage access to multiple domains or storage units that are supported through the virtual functions.

As shown in FIG. 3, the QoS manager 132 may include a credit counter 302 (e.g., credit register set) and may be operably coupled with one or more of the inbound queue 128, the DMA engine 130, and components of the I/O processing system 210. As such, the QoS manager 132 may control, interact with, or communicate with the inbound queue 128, the DMA engine 130, and components of the I/O processing system 210 to implement aspects of QoS as described herein. Generally, the credit counter 302 can be configured to store a respective credit balance of one or more submission queues of the host 202. In some implementations, the credit counter 302 includes registers configured to maintain the respective credit balances for submission queues 120 or functions of the storage controller or hardware accelerator. The QoS manager 132 may access or manage the credit balances maintained by the credit counter 302, which may include decrementing a credit balance, incrementing a credit balance, or resetting a credit balance. In some cases, firmware of the storage controller or hardware accelerator may also access or edit the credit balances. For example, the firmware may edit a credit balance of a submission queue or function based on QoS parameters 134 or changes to a QoS policy or a level of service.

In various aspects, the QoS manager 132 may implement QoS policies maintained by the QoS parameters 134 to implement aspects of QoS as described herein. For example, the QoS manager 132 may determine that a submission queue 120 of the host 202 holds an I/O command for data access to the storage media and compare a credit cost of the I/O command with a credit balance of the submission queue. In response to the credit cost of the I/O command exceeding the credit balance of the submission queue, the QoS manager can prevent the I/O command from moving from the submission queue to an inbound queue. Alternatively, in response to the credit cost of the I/O command not exceeding the credit balance of the submission queue, the QoS manager 132 can allow the I/O command to move from the submission queue to the inbound queue.

In this example, the QoS parameters 134 of the storage controller 122 are configured to maintain various QoS policies and settings of the QoS manager 132. In other implementations, the described parameters and/or QoS policies may be stored to any suitable memory of the controller or a hardware accelerator. Generally, the QoS parameters 134 may include values useful to define or quantify a bandwidth of access provided to a submission queue, function, or name space, such as an amount of data per credit, initial credit balances, chunking size threshold, or the like. Alternately or additionally, the QoS parameters may include or reference a physical region page (PRP) list of an I/O command (e.g., for a number of LBAs or IOPs), a scatter gather list of an I/O command (e.g., for a number of LBAs or IOPs), a number of I/O operations or segments associated with the I/O command, or an identifier of a stream of I/O command segments of an I/O command.

The QoS parameters 134 may also include QoS polices implemented by the QoS manager 132 in accordance with various aspects described herein. As shown FIG. 3, the QoS parameters 134 include command QoS policies 304 for handling the command phase of I/O command processing and data QoS policies 306 for handling the data phase of the I/O command processing. In aspects, the command QoS policies 304 include a credit-based queue throttling mechanism that enables the QoS manager 132 (e.g., acting as a QoS layer) to control fetching of SQ elements from the host SQs 120. In some implementations, the QoS manager 132 may do so in hardware without an on-chip CPU of the controller. In this example configuration, the command QoS policies 306 include a queue-based credit policy 308 and a function-based policy 310, which may be implemented in accordance with the methods described with reference to FIGS. 7-10.

Generally, the QoS manager 132 may implement the queue-based credit policy 308 to manage a credit balance associated with the submission queue on a per-queue basis to limit a number of the I/O commands that are fetched from the submission queue and other submission queues of the host based on respective credit balances of the submission queues. Alternatively or additionally, the QoS manager 132 may implement the function-based credit policy 310 to manage a credit balance associated with the submission queue on a per-function basis to limit a number of I/O commands that are fetched from the submission queue and other submission queues of the host based on a credit balance of a physical function or a virtual function with which the submission queue and the other submission queues are associated.

With respect to the data phase of I/O command processing, the data QoS policies 306 may include a chunk-based algorithm 312 for chunking or segmenting I/O commands, as well as a limit unused bandwidth scheduling model 314 (LUB model 314) and a distribute unused bandwidth scheduling model 316 (DUB model 316). In aspects, the QoS manager 132 may implement the chunk-based algorithm 312 to manage data transfers from multiple entities can be managed based on credits that are multiples of the chunk or segment size threshold (e.g., 4-32 KiB). In other words, the QoS manager 132 can break, segment, or partition an I/O command (e.g., NVMe command) into multiple chunks (uniform or non-uniform) based on the threshold (e.g., sizing parameter) and then submit chunk (or segmented) commands in a weighted fashion (e.g., weighted-round robin (WRR)) to the DMA engine 130. Alternatively or additionally, the QoS manager 132 can implement the scheduling models waste or consume unused bandwidth allocated to an entity by executing idle commands in place of actual commands that transfer data over the data link (e.g., PCIe link). For example, the LUB model 314 may use idle commands to move an equivalent amount of chunk data (e.g., 4 KiB) between internal ports of the controller (e.g., dummy ports), which may provide a method for "wasting" allocated bandwidth in terms of time. With the DUB model 316, the QoS manager 132 may distribute any unused bandwidth allocated to a particular entity amongst other entities within a system that may have a need to transfer data beyond an allocated quota or threshold.

Figure 4:
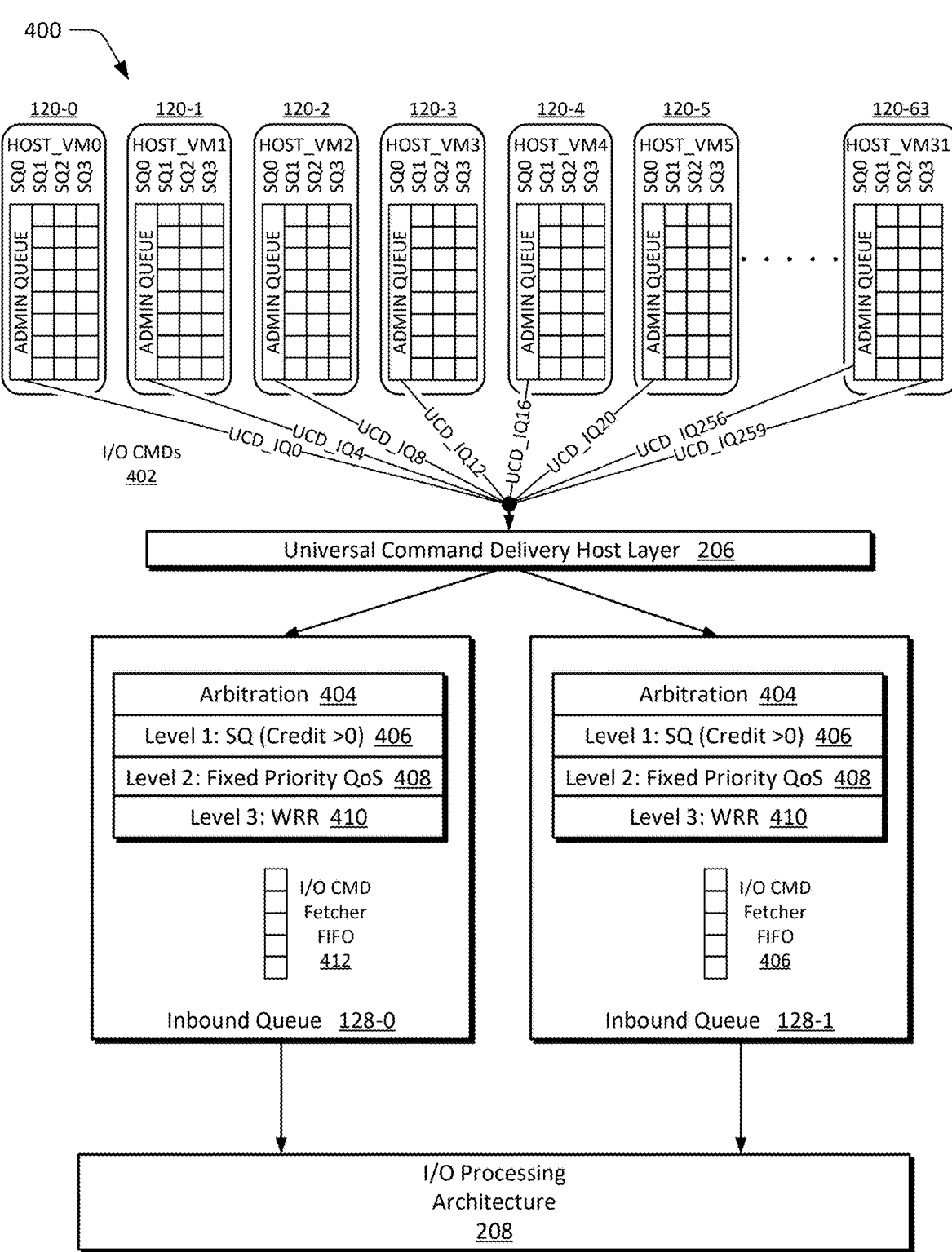
FIG. 4 illustrates example configurations of host submission queues and inbound queues implemented in accordance with one or more aspects.

FIG. 4 illustrates at 400 example configurations of host submission queues and inbound queues implemented in accordance with one or more aspects. In this example, the host SQs 120 are coupled with the UCD host layer 206 of the storage controller 122, which can provide the I/O commands 402 to one or more inbound queues 128 of the controller. Generally, the host 202 may be implemented as a multi-tenant host with any suitable number of virtual machines or tenants having access to respective NVMe command queues. In this example, the host 202 may include any suitable number of VMs (not shown) associated with host submission queues 120-0 through 120-63. These NVMe or submission queues 120 may be implemented in host memory and configured by the host to be any suitable number of administrative queues (admin queues) or I/O command queues.

With reference to command flow, host entities (e.g., VMs) can submit admin commands or I/O commands to respective SQs 120 and ring a corresponding UCD doorbell for that queue. The UCD host layer 206 may fetch, responsive to the doorbell and as permitted by the QoS manager 132, SQ elements (e.g., I/O commands) based on a pre-configured arbitration scheme 404 implemented by the inbound queue 128-0 or 128-1. In this example, the inbound queues 128 are configured to implement a three level arbitration scheme 404 that includes a credit-based QoS policy 406 (e.g., command QoS policy 304), a fixed priority QoS policy 408, and a weighted-round robin policy 410. Based on the arbitration schemes and/or the QoS manager 132, the SQ elements or I/O commands 402 may be moved to the I/O command fetcher first-in, first-out (FIFO) buffer 412 for submission to the I/O processing system 210.

Figure 5:
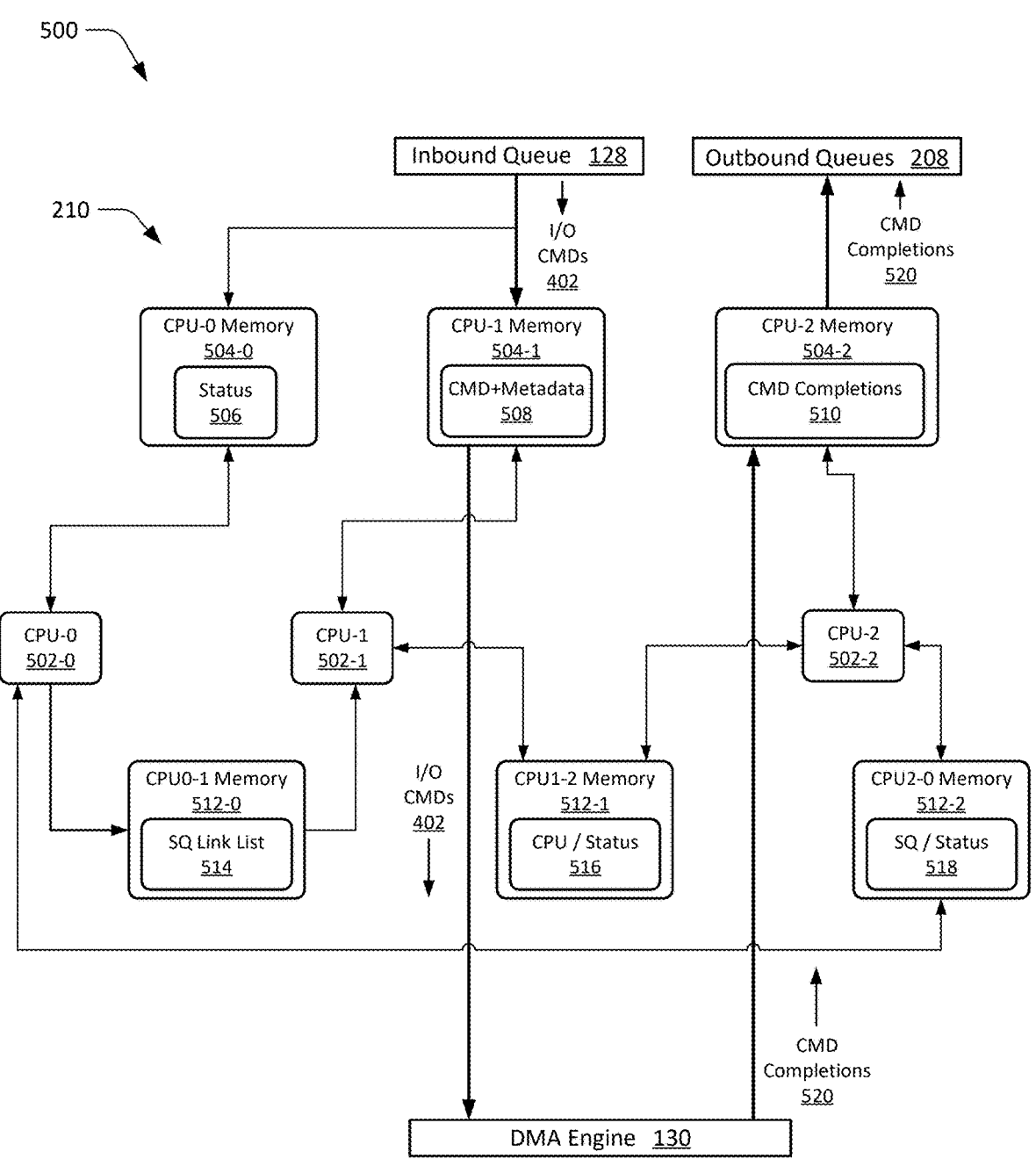
FIG. 5 illustrates an example configuration of an I/O processing system in which a QoS manager can be implemented in accordance with one or more aspects.

FIG. 5 illustrates at 500 an example configuration of an I/O processing system in which a QoS manager can be implemented in accordance with one or more aspects. Generally, the I/O processing system 210 or I/O processing path of the storage controller 122 may be implemented with any suitable number of CPUs, memories, and/or shared memories. In this example, the I/O processing system 210 includes CPU-0 502-0, CPU-1 502-1, and CPU-2 502-2 (e.g., on-chip or embedded CPUs), which may be configured to execute similar or different instructions to implement various functionalities of the I/O processing system 210. A CPU of the I/O processing system 210 may be operably coupled with a memory or a shared memory, either of which may be implemented a tightly coupled memory with the CPU. As shown in FIG. 5, CPU-0 502-0 can be operably coupled with CPU-0 memory 504-0, which may be configured to store I/O command status information 506 and CPU-1 502-1 can be operably coupled with CPU-1 memory 504-1, which may be configured to store command and metadata information 508 for the I/O commands. A CPU-2 memory of the I/O processing system 210 may be coupled to the CPU-2 502-2 and outbound queues 208 of the system, and configured to store or forward command completions 510.

In aspects, the CPUs 502 of the I/O processing system 210 may be coupled with shared memories 512, which may enable the CPUs to share information and/or update status between CPUs for the processing of I/O commands. For example, a shared memory for CPU0-1 512-0 of CPU-0 502-1 and CPU-1 502-1 may store a submission queue link list 514 (SQ link list 514) or a VF array of information indicating which submission queue or I/O command is assigned to a corresponding slot of the DMA engine 130. A second shared memory CPU1-2 shared memory 512-1 of CPU-1 502-1 and CPU-2 502-2 may be configured to store CPU and status information 516, which may include destination free list (DFL) of a submission queue and CPU status for processing chunks or segments of I/O commands. Alternatively or additionally, shared memory CPU2-0 512-2 may be coupled with the CPU-0 502-0 and CPU-2 502-2 and be configured to store SQ and status information 518 useful to track command completions 520, which may correspond to I/O commands completed by the DMA engine 130.

In various aspects, the QoS manager 132 may interact with the CPU-0 502-0, CPU-1 502-1, and/or CPU-2 502-2 to implement aspects of QoS as described herein. For example, after an I/O command 402 moves from the inbound queue 128 to the CPU-1 memory 504, the I/O processing system 210 may segment the I/O command based on a sizing parameter to provide multiple I/O command segments that transact similar amounts of respective data. The I/O processing system 210 may then provide the multiple I/O command segments to the DMA engine for completion, which may include marking I/O command segments as first, intermediate, and last to enable the DMA engine 120 to process a stream of the I/O command segments. The I/O processing system 210 may also indicate, through the outbound queues 208 to the host, completion 520 of the I/O command in response to the completion of the multiple I/O command segments by the DMA engine.

Figure 6:
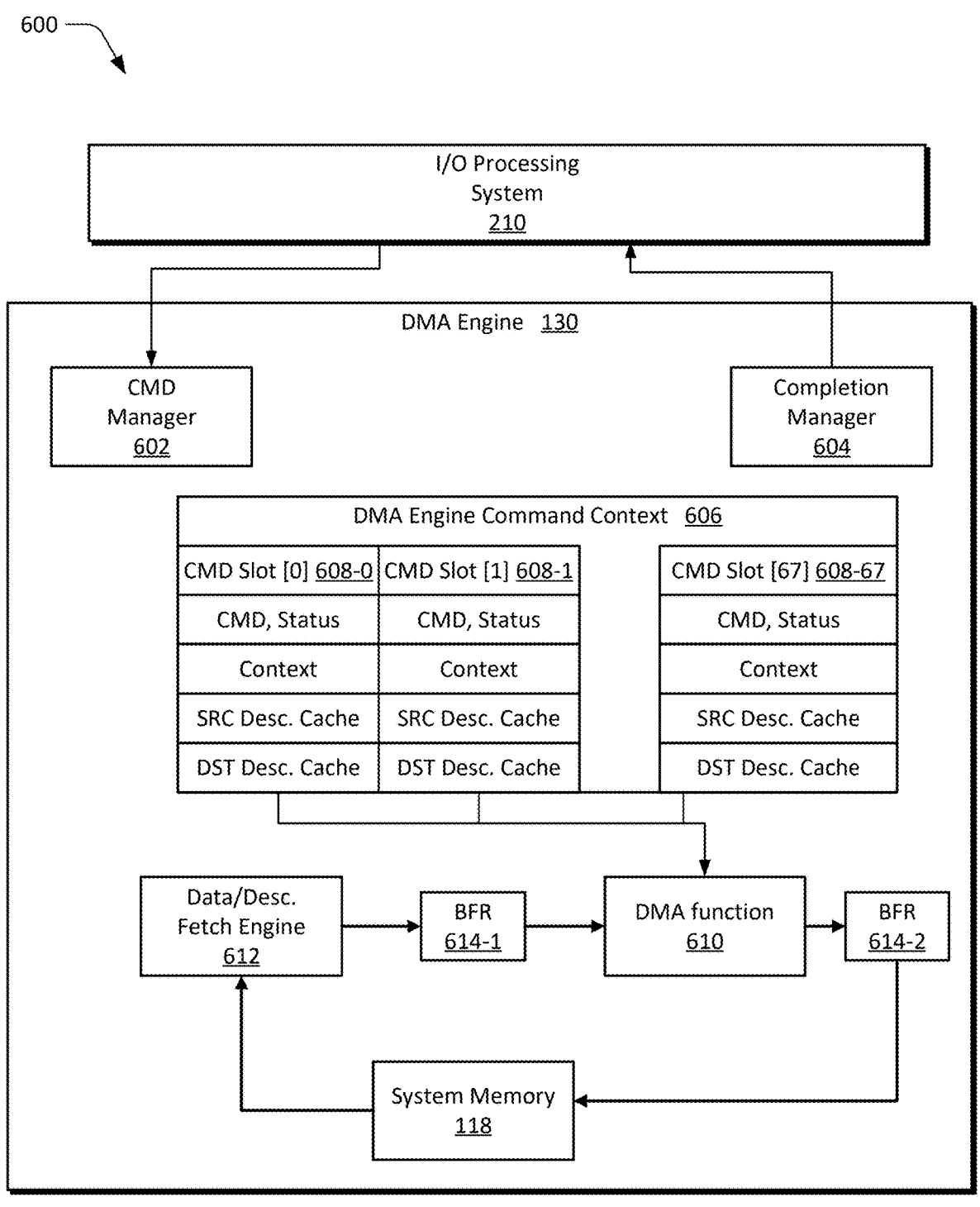
FIG. 6 illustrates an example configuration of a direct memory access (DMA) engine that can be implemented in accordance with aspects of a QoS-enabled storage controller.

FIG. 6 illustrates at 600 an example configuration of a DMA engine that can be implemented in accordance with aspects of a QoS-enabled storage controller. In aspects, a DMA engine 130 may be designed or pre-configured to manage simultaneous data streams of chunks or segments associated with multiple entities. In this example, the DMA engine 130 includes a command manager 602 to receive I/O command segments or chunks from the I/O processing system 210 and a completion manager 604 to provide indication of completions of streams of I/O command segments. The DMA engine 130 may include a DMA engine command context table 606 of multiple I/O command slots 608-1 through 608-67 for storing respective context information associated with multiple streams of I/O command segments. A context slot 608 may be implemented in hardware and configured to store context information of an I/O command that includes a command, a status, a context, a source descriptor cache, a destination descriptor cache, or the like. Based on the context information of a respective slot 608, the DMA engine 130 can process I/O command segments through a DMA function 610 (e.g., storage, cryptography) using a data/descriptor fetch engine 612 and block factoring units 614-1 and 614-2 to implement DMA operations with system memory 118.

In various aspects, the DMA engine 130 process or transfer data chunks in the same order in which the chunk commands were submitted to it by the QoS manager 132 or I/O processing system 210 of the storage controller. Generally, a context slot 608 can be assigned while processing a first chunk of a new command and may be released while processing a last chunk of a command. During a data context switch, the context information of a current chunk or segment can be saved to its associated slot 608 and restored from the associated slot 608 to process the next chunk or segment of the command. This mechanism may allow all entities to be serviced uniformly according to a user-defined or pre-defined QoS policy while maintaining QoS parameter (e.g., latency, bandwidth, throughput) fairness between commands with small block sizes (e.g., 4-32 KiB) and large block sizes (e.g., 1-2 MB).

Techniques of a QoS-Enabled Storage Controller

The following discussion describes techniques of a QoS-enabled storage controller or hardware accelerator, which may ensure that service and/or execution of host commands, as well as data movement, is managed to a quality-of-service level or parameter associated with a particular entity, such as an NVMe queue, an NVMe namespace, virtual function, of the like. These techniques may be implemented using any of the environments and entities described herein, such as the inbound queue 128, DMA engine 130, QoS manager 132, or QoS parameters 134, which may provide means for implementing one or more of the operations described with reference to the methods of FIGS. 7-10. These techniques include methods illustrated in FIGS. 7-10, each of which is shown as a set of operations performed by one or more entities. The described operations of the methods may be performed using any suitable circuitry or component, such as the inbound queue 128, DMA engine 130, QoS manager 132, QoS parameters 134, I/O processing system 210, credit counter 302, command QoS policies 304, or data QoS policies 306, which may provide means for implementing one or more of the operations described with reference to the methods of FIGS. 7-10.

These methods are not necessarily limited to the orders of operations shown in the associated figures. Rather, any of the operations may be repeated, skipped, substituted, or re-ordered to implement various aspects described herein. Further, these methods may be used in conjunction with one another, in whole or in part, whether performed by the same entity, separate entities, or any combination thereof. For example, the methods may be combined to provide credit-based I/O command processing and data phase QoS with block-size aware latency management. In portions of the following discussion, reference will be made to the operating environment 100 of FIG. 1 and entities of FIGS. 2-6 by way of example. Such reference is not to be taken as limiting described aspects to the operating environment 100, entities, or configurations, but rather as illustrative of one of a variety of examples. Alternately or additionally, operations of the methods may also be implemented by or with entities described with reference to the System-on-Chip of FIG. 11 and/or the storage media controller of FIG. 12.

FIG. 7 depicts an example method 700 for implementing credit-based QoS in a storage media controller or hardware accelerator. The operations of method 700 may be performed by or with the inbound queue 128, QoS manager 132, QoS parameters 134, I/O processing system 210, credit counter 302, or command QoS policies 304.

At 702, a QoS manager of a storage media controller or hardware accelerator determines that a submission queue of a host holds an I/O command. The I/O command may be for access to storage media associated with the storage media controller or another function of the controller or hardware accelerator. In some cases, an entity of the host asserts an indication or doorbell alert to notify the submission queue or a command fetcher that the I/O command has been submitted to the storage media controller.

At 704, the QoS manager determines a credit balance of the submission queue by accessing a credit counter associated with the submission queue. The QoS manager may be configured to implement a queue-based credit policy or a function-based credit policy as described herein. If the QoS manager determines that the credit balance of the submission queue is zero, the QoS manager may advance to operation 708 of the method 700.

At 706, the QoS manager compares a credit cost of the I/O command with the credit balance of the submission queue. In some cases, the QoS manager determines the credit cost of the I/O command based on an amount of data the I/O command will transact when processed by the storage media controller. The QoS manager may use descriptors, address information, or metadata of the I/O command to determine the credit cost of the I/O command.

Optionally at 708, in response to the credit cost of the I/O command exceeding the credit balance of the submission queue, the QoS manager prevents the I/O command from moving from the submission queue to an inbound queue of the storage media controller. In some implementations, the QoS manager prevents movement of the I/O command by preventing the command from being fetched by the inbound queue, a command fetcher, or a command arbiter of the storage media controller. From operation 708, the method 700 may return to operation 704 to implement another partial iteration of the method to process the I/O command once the credit balance meets or exceeds the credit cost of processing the data transaction of the I/O command.

Optionally at 710, in response to the credit cost of the I/O command not exceeding the credit balance of the submission queue, the QoS manager allows the I/O command to move from the submission queue to the inbound queue of the storage media controller. In some cases, the QoS manager allows the I/O command to move by allowing the inbound queue, the command fetcher, or the command arbiter of the storage media controller to fetch the I/O command from the submission queue of the host.

Optionally at 712, the QoS manager decrements the credit balance of the submission queue based on the credit cost of the I/O command. In some implementations, this is based on or in response to the I/O command moving from the submission queue to the inbound queue of the storage media controller. From operation 712, the method 700 may return to operation 702 to implement another iteration of the method to process subsequent I/O commands received from the submission queue.

FIG. 8 depicts an example method 800 for managing I/O command traffic with a credit-based QoS policy. The operations of method 800 may be performed by or with the inbound queue 128, QoS manager 132, QoS parameters 134, I/O processing system 210, credit counter 302, or command QoS policies 304.

At 802, a QoS manager of a storage media controller or hardware accelerator determines that a submission queue of a host holds an I/O command. The I/O command may be for access to storage media associated with the storage media controller or another function of the controller or hardware accelerator. In some cases, an entity of the host asserts an indication or doorbell alert to notify the submission queue or a command fetcher that the I/O command has been submitted to the storage media controller.

At 804, the QoS manager determines the credit cost of the I/O command. The QoS manager may determine the credit cost based on an amount of data the I/O command will transact when processed by the storage media controller. The QoS manager may use descriptors, address information, or metadata of the I/O command to determine the credit cost of the I/O command. In some implementations, the QoS manager determines the credit cost of the I/O command based on a QoS parameter that specifies a credit cost per amount of data transacted by the I/O command (e.g., 1 credit per 32 KiB data).

At 806, the QoS manager determines a credit balance of the submission queue by accessing a credit counter associated with the submission queue. In some cases, the QoS manager determines the credit balance of the submission queue by accessing a credit counter of a physical or virtual function with which the submission queue is associated, such as when the QoS manager is configured to implement a function-based credit policy as described herein. If the QoS manager determines that the credit balance of the submission queue is zero, the QoS manager may advance to operation 810 of the method 800.

At 808, the QoS manager compares the determined credit cost of the I/O command with the credit balance of the submission queue. In some cases, the QoS manager compares the determined credit cost of the I/O command with a credit balance of a virtual function or physical function with which the submission queue is associated. If the credit cost of the I/O command exceeds the credit balance of the submission queue or function, the method 800 may proceed to operation 810. Alternatively, if the credit cost of the I/O command does not exceed the credit balance of the submission queue or function, the method 800 may proceed to operation 812.

Optionally at 810, the QoS manager prevents the I/O command from moving from the submission queue to an inbound queue. In some implementations, the QoS manager prevents movement of the I/O command by preventing the command from being fetched by the inbound queue, a command fetcher, or a command arbiter of the storage media controller. From operation 810, the method 800 may return to operation 806 to implement another partial iteration of the method to process the I/O command once the credit balance of the submission queue meets or exceeds the credit cost of processing the data transaction of the I/O command.

Optionally at 812, the QoS manager allows the I/O command to move from the submission queue to the inbound queue. In some cases, the QoS manager allows the I/O command to move by allowing the inbound queue, the command fetcher, or the command arbiter of the storage media controller to fetch the I/O command from the submission queue of the host. At 814, the QoS manager decrements the credit balance of the submission queue by the credit cost of the I/O command in response to fetching the I/O command. Alternatively or additionally, the QoS manager may decrement the credit balance of the virtual function or physical function with which the submission queue or I/O command is associated. From operation 816, the method 800 may return to operation 802 to implement another iteration of the method 800 to process other I/O commands submitted by entities of the host.

At 816, the QoS manager increments the credit balance of the submission queue by the credit cost of the I/O command in response to completing the I/O command. In other words, the QoS manager may replenish the credit balance of the submission queue with a number of credits equal to the credit cost of the I/O command. Alternatively or additionally, the QoS manager may increment the credit balance of the virtual function or physical function with which the submission queue or I/O command is associated.

FIG. 9 depicts an example method 900 for segmenting I/O command based on a size threshold to provide I/O command segments. The operations of method 900 may be performed by or with the QoS manager 132, QoS parameters 134, I/O processing system 210, or data QoS policies 306.

At 902, a QoS manager of a storage controller or hardware accelerator segments an I/O command based on a sizing parameter to provide multiple I/O command segments that transact similar amounts of respective data. In some cases, the QoS manager segments or chunks a data transfer of the I/O command based on a threshold or segment size (e.g., 4-32 KiB) to provide the multiple I/O command segments.

At 904, the QoS manager associates the I/O command segments with an identifier of the I/O command. For example, the QoS manager may associate the I/O command segments with an identifier (e.g., UCD ID) or context, which may be useful to move or track execution of the I/O command segments through an I/O processing system or path.

At 906, the QoS manager designates or marks a first of the multiple I/O command segments as an initial I/O command segment of the multiple I/O command segments for the I/O command. By designating or marking the multiple I/O command segments as initial, intermediate, or final segments, the QoS manager can enable tracking of the I/O command segments through an I/O processing system and/or a DMA engine. For example, the DMA engine may execute the I/O command segments as a stream that includes a first segment, one or more intermediate segments, and a final segment that completes execution of the I/O command. In the case of a single I/O command segment, the segment may be marked as a first and a last segment of the I/O segment stream. Accordingly, at 908, the QoS manager designates or marks a second of the multiple I/O command segments as an intermediate I/O command segment of the multiple I/O command segments for the I/O command. At 910, the QoS manager designates or marks a third of the multiple I/O command segments as a final I/O command segment of the multiple I/O command segments for the I/O command.

At 912, the QoS manager provides the multiple I/O command segments to a DMA engine based on a QoS policy. For example, the QoS manager may submit chunked (or segmented) commands in a priority-based and/or weighted fashion (e.g., weighted-round robin (WRR)) to the DMA engine, which may manage concurrent data streams of chunks or segments associated with multiple entities. On completion of the final or last I/O command segment, the QoS manager or outbound queue of the storage controller may receive an indication of completion from the DMA engine.

FIG. 10 depicts an example method 1000 for processing I/O command segments with a DMA engine. The operations of method 1000 may be performed by or with the DMA engine 130, QoS manager 132, QoS parameters 134, I/O processing system 210, or data QoS policies 306.

At 1002, a DMA engine receives a first I/O command segment of a stream of multiple I/O command segments. The I/O command segments may be received from a memory of an I/O processing system based on a QoS policy in a priority-based or weighted fashion (e.g., weighted-round robin (WRR)). At 1004 the DMA engine assigns a context slot to the stream of the multiple I/O command segments. In some aspects, the DMA engine includes hardware storage slots useful to store context information for executing all the chunks or segments of an I/O command.

At 1006, the DMA engine processes the first I/O command segment of the stream of the multiple I/O command segments using the context information. Processing the first I/O command segment may include providing data of the first I/O command segment to a data/descriptor fetch engine of the DMA engine for accessing memory of the host and/or another function (e.g., cryptography) of the DMA engine. At 1008, the DMA engine saves context information of the stream of the multiple I/O command segments to the context slot. The DMA engine may save the context information after completing of the first I/O segment, which allowed the DMA engine to processes other I/O command segments of another context slot for another entity.

At 1010, the DMA engine restores the context information of the stream of the multiple I/O command segments from the context slot. The DMA engine may restore the context information in response to receiving a next I/O command segment from the I/O processing system. For example, during a data context switch, the context information of a current segment can be saved to an associated slot and context information of a next I/O command segment of another stream is restored from its associated slot. At 1012, the DMA engine processes a next I/O command segment of the stream of the multiple I/O command segments using the context information. In aspects, the DMA engine may process and transfer data chunks or segments in the same order in which the chunked or segmented commands were submitted by the I/O processing system or CPU of the storage controller.

At 1014, the DMA engine provides an indication of completion in response to processing a last I/O command segment of the stream of the multiple I/O command segments. For example, the DMA engine may provide an indication to a completion handler of the storage controller. Alternatively or additionally, the DMA engine can release the context slot based on completion of the final or last I/O command segment of the stream with which the context slot is associated.

System-On-Chip

Figure 11:
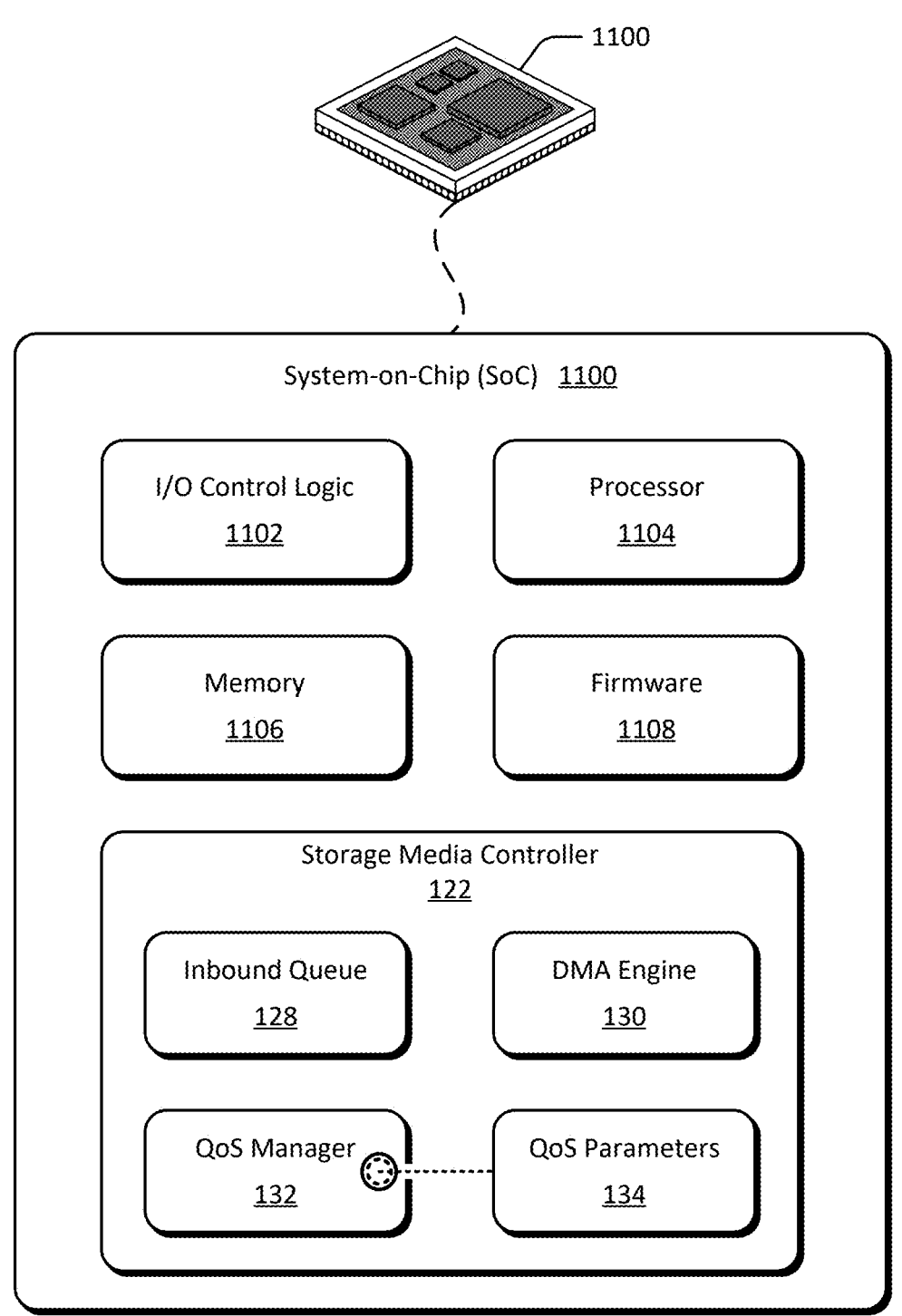
FIG. 11 illustrates an example System-on-Chip (SoC) environment for implementing aspects of QoS-enabled I/O processing.

FIG. 11 illustrates an exemplary System-on-Chip (SoC) 1100 that may implement various aspects of credit-based QoS, such as for media or hardware accessible over an NVMe interface. The SoC 1100 may be implemented in any suitable device, such as a computing device, host device, storage media controller, hardware accelerator, network-attached storage, smart appliance, printer, set-top box, server, data center, solid-state drive (SSD), storage drive array, memory module, automotive computing system, server, server blade, storage blade, storage backplane, storage media expansion device, storage media card, storage media adapter, network attached storage, Fabric-enabled storage target, NVMe-based storage controller, or any other suitable type of device (e.g., others described herein). Although described with reference to a SoC, the entities of FIG. 11 may also be implemented as other types of integrated circuits or embedded systems, such as an application-specific integrated-circuit (ASIC), storage controller card, storage backplane, storage controller, communication controller, application-specific standard product (ASSP), digital signal processor (DSP), programmable SoC (PSoC), system-in-package (SiP), or field-programmable gate array (FPGA).

The SoC 1100 may be integrated with electronic circuitry, a microprocessor, memory, input-output (I/O) control logic, communication interfaces, firmware, and/or software useful to provide functionalities of a host device or storage system, such as any of the devices or components described herein (e.g., storage drive or storage array). The SoC 1100 may also include an integrated data bus or interconnect fabric (not shown) that couples the various components of the SoC for data communication or routing between the components. The integrated data bus, interconnect fabric, or other components of the SoC 1100 may be exposed or accessed through an external port, parallel data interface, serial data interface, peripheral component interface, or any other suitable data interface. For example, the components the SoC 1100 may access or control external storage media through an external interface or off-chip data interface.

In this example, the SoC 1100 includes various components such as input-output (I/O) control logic 1102 and a hardware-based processor 1104 (processor 1104), such as a microprocessor, processor core, application processor, DSP, or the like (e.g., processing resource separate from a host x86 processor). The SoC 1100 also includes memory 1106, which may include any type and/or combination of RAM, SRAM, DRAM, non-volatile memory, ROM, one-time programmable (OTP) memory, multiple-time programmable (MTP) memory, Flash memory, and/or other suitable electronic data storage. In some aspects, the processor 1104 and code stored on the memory 1106 are implemented as a storage media controller or hardware accelerator to provide various functionalities associated with providing QoS for storage media access or other device functions. In the context of this disclosure, the memory 1106 stores data, code, instructions, or other information via non-transitory signals, and does not include carrier waves or transitory signals. Alternately or additionally, the SoC 1100 may comprise a data interface (not shown) for accessing additional or expandable off-chip storage media, such as magnetic memory or solid-state memory (e.g., Flash or NAND memory).

The SoC 1100 may also include firmware 1108, applications, programs, software, and/or operating systems, which may be embodied as processor-executable instructions maintained on the memory 1106 for execution by the processor 1104 to implement functionalities of the SoC 1100. The SoC 1100 may also include other communication interfaces, such as a transceiver interface for controlling or communicating with components of a local on-chip (not shown) or off-chip communication transceiver. Alternately or additionally, the transceiver interface may also include or implement a signal interface to communicate radio frequency (RF), intermediate frequency (IF), or baseband frequency signals off-chip to facilitate wired or wireless communication through transceivers, physical layer transceivers (PHYs), or media access controllers (MACs) coupled to the SoC 1100. For example, the SoC 1100 may include a transceiver interface configured to enable storage over a wired or wireless network, such as to provide a network attached storage (NAS) volume with virtualized storage isolation features.

The SoC 1100 also includes an instance of a storage media controller 122 (e.g., a switch or accelerator controller) with inbound queue(s) 128, DMA engine 130, QoS manager 132, and QoS parameters 134, which may be implemented separately as shown or combined with a storage component or data interface. In accordance with various aspects of providing a credit-based or adaptive QoS for solid-state storage or other services, the storage media controller 122 may chunk or segment I/O command operations and fairly allocate processing of I/O command and data operations across multiple host entities, such as described herein.

Any of the entities of the SoC 1100 may be embodied as disparate or combined components, as described with reference to various aspects presented herein. Examples of these components and/or entities, or corresponding functionality, are illustrated and/or described with reference to the respective components or entities of the environment 100 of FIG. 1 or respective examples illustrated in FIGS. 2-6. The QoS manager 132 either in whole or part, may be implemented as processor-executable instructions maintained by the memory 1106 and executed by the processor 1104 to implement various aspects and/or features of providing a credit-based QoS for solid-state storage and/or other data processing functions.

The storage media controller 122, DMA engine 130, QoS manager 132, and/or QoS parameters 134, may be implemented independently or in combination with any suitable component or circuitry to implement aspects described herein. For example, the DMA engine 130 and/or QoS manager 132 may be implemented as part of a DSP, ASIC, processor/storage bridge, I/O bridge, graphics processing unit, memory controller, storage controller, arithmetic logic unit (ALU), or the like. The DMA engine 130 and/or QoS manager 132 may also be provided integrally with other entities of SoC 1100, such as integrated with the processor 1104, memory 1106, a host interface, a storage media interface, or firmware 1108 of the SoC 1100. Alternately or additionally, the storage media controller 122, DMA engine 130, QoS manager 132, and/or QoS parameters 134, and/or other components of the SoC 1100 may be implemented as hardware, firmware, fixed logic circuitry, or any combination thereof.

Figure 12:
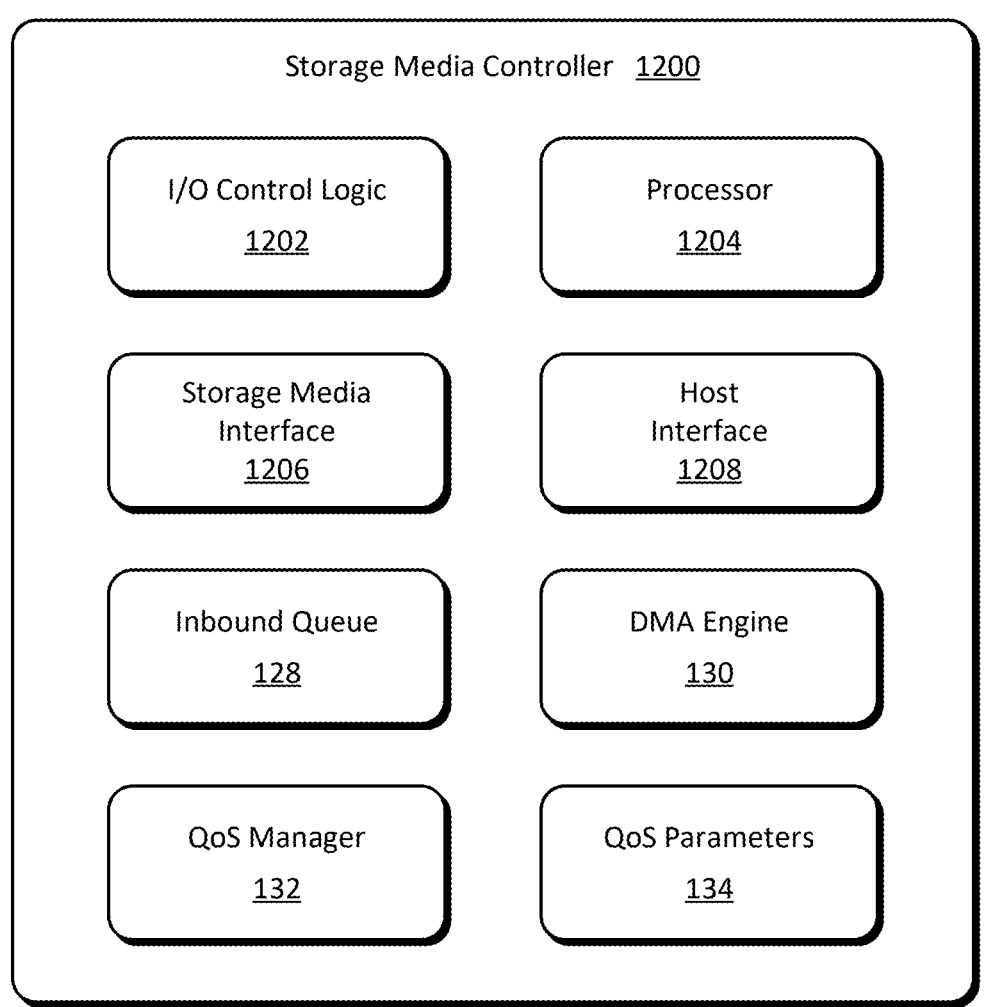
FIG. 12 illustrates an example storage media controller that is configured to implement aspects of a QoS-enabled storage controller.

As another example, consider FIG. 12 which illustrates an example storage media controller 1200 in accordance with one or more aspects of providing a credit-based QoS for solid-state storage or other data functions. In various aspects, the storage media controller 1200 or any combination of components thereof may be implemented as a storage drive controller, hardware accelerator, storage media switch, storage media controller, NAS controller, NVMe initiator, NVMe target, or a storage aggregation controller for solid-state storage. In some cases, the storage media controller 1200 is implemented similar to or with components of the SoC 1100 as described with reference to FIG. 11. In other words, an instance of the SoC 1100 may be configured as a storage media controller, a storage media accelerator controller, or storage media controller, such as the storage media controller 1200 to provide and manage QoS over interfaces for solid-state storage and/or other functions (e.g., virtual functions or physical functions).

In this example, the storage media controller 1200 includes input-output (I/O) control logic 1202 and a processor 1204, such as a microprocessor, processor core, application processor, DSP, or the like. In some aspects, the processor 1204 and firmware of the storage media controller 1200 may be implemented to provide various functionalities associated with providing a credit-based QoS for various queues associated with storage media access, such as those described herein. The storage media controller also includes a storage media interface 1206 and a host interface 1208, which enable access to storage media and host system, respectively. The storage media interface 1206 may include a physical page addressing (PPA) interface, peripheral component interconnect express (PCIe) interface, non-volatile memory express (NVMe) interface, NVM over Fabric (NVM-OF) interface, NVM host controller interface specification (NVMHCIS) compliant interface, or the like. Alternately or additionally, the host interface may include a PCIe interface, SATA-based interface, NVMe interface, NVM-OF interface, NVMHCIS compliant interface, Fabric-enabled storage interface, or the like.

The storage media controller 1200 also includes instances of inbound queue(s) 128, DMA engine 130, QoS manager 132, and QoS parameters 134. Any or all of which may be implemented separately as shown in the storage media controller or combined with the processor 1204, storage media interface 1206, host interface 1208, or a flash or NVMe translation layer (not shown). In accordance with various aspects of providing a credit-based or adaptive QoS for solid-state storage or other services, the storage media controller 1200 may chunk or segment I/O command operations and fairly allocate processing of I/O command and data operations across multiple host entities, such as described herein. Examples of these components and/or entities, or corresponding functionality, are described with reference to the respective components or entities of the environment 100 of FIG. 1 or respective configurations illustrated in FIGS. 2-6. The storage media controller 1200, either in whole or part, may be implemented as processor-executable instructions maintained by memory (not shown) of the controller and executed by the processor 1204 to implement various aspects and/or features of with providing credit-based QoS for queue management and data processing in association with storage media access.

Although the subject matter of a QoS-enabled storage controller has been described in language specific to structural features and/or methodological operations, it is to be understood that the subject matter recited in the appended claims is not necessarily limited to the specific examples, features, or operations described herein, including orders in which they are performed.

What is claimed is:

1. A method for providing Quality of Service (QoS) for storage media access, comprising:

determining, by a storage media controller, that a submission queue of a host holds an I/O command for data access to storage media associated with the storage media controller;

determining a credit balance of the submission queue by accessing a credit counter associated with the submission queue;

comparing a credit cost of the I/O command with the credit balance of the submission queue; and in response to the credit cost of the I/O command exceeding the credit balance of the submission queue, preventing the I/O command from moving from the submission queue to an inbound queue of the storage media controller; or in response to the credit cost of the I/O command not exceeding the credit balance of the submission queue:

allowing the I/O command to move from the submission queue to the inbound queue of the storage media controller;

after the I/O command moves to the inbound queue, segmenting the I/O command based on a sizing parameter to provide multiple I/O command segments; and providing the multiple I/O command segments to the storage media controller.

2. The method as recited in claim 1, wherein:

preventing the I/O command from moving from the submission queue to the inbound queue comprises preventing the I/O command from being fetched by the inbound queue, a command fetcher, or a command arbiter of the storage media controller; or allowing the I/O command to move from the submission queue to the inbound queue comprises allowing the inbound queue, the command fetcher, or the command arbiter of the storage media controller to fetch the I/O command from the submission queue of the host.

3. The method as recited in claim 1, further comprising:

implementing, by the storage media controller, a queue-based credit policy in which the credit balance associated with the submission queue is managed on a per-queue basis to limit a number of the I/O commands that are fetched from the submission queue and other submission queues of the host based on respective credit balances of the submission queues.

4. The method as recited in claim 1, further comprising:

implementing, by the storage media controller, a function-based credit policy in which the credit balance associated with the submission queue is managed on a per-function basis to limit a number of I/O commands that are fetched from the submission queue and other submission queues of the host based on a credit balance of a physical function or a virtual function with which the submission queue and the other submission queues are associated.

5. The method as recited in claim 1, further comprising:

in response to the I/O command moving from the submission queue to the inbound queue of the storage media controller, decrementing the credit balance of the submission queue based on the credit cost of the I/O command.

6. The method as recited in claim 1, further comprising determining the credit cost of the I/O command based on a size of a data transaction associated with the I/O command.

7. The method as recited in claim 1, further comprising:

providing the multiple I/O command segments to the storage media controller comprises providing the multiple I/O command segments to a direct memory access (DMA) engine of the storage media controller; and receiving an indication of completion from the DMA engine based on completion of the multiple I/O command segments.

8. The method as recited in claim 1, further comprising:

designating a first of the multiple I/O command segments as an initial I/O command segment of the multiple I/O command segments for the I/O command;

designating a second of the multiple I/O command segments as an intermediate I/O command segment of the multiple I/O command segments for the I/O command; or designating a third of the multiple I/O command segments as a final I/O command segment of the multiple I/O command segments for the I/O command.

9. The method as recited in claim 1, further comprising:

replenishing the credit balance of the submission queue in response to completion of the I/O command by the storage media controller.

10. A storage media controller comprising:

an interface configured to enable access to a submission queue of a host;

an inbound queue configured to store I/O commands for access to storage media associated with the storage media controller;

a credit counter configured to store a credit balance of the submission queue; and a quality-of-service (QoS) manager configured to:

determine that the submission queue holds an I/O command for data access to the storage media;

compare a credit cost of the I/O command with the credit balance of the submission queue; and in response to the credit cost of the I/O command exceeding the credit balance of the submission queue, prevent the I/O command from moving from the submission queue to the inbound queue; or in response to the credit cost of the I/O command not exceeding the credit balance of the submission queue:

allow the I/O command to move from the submission queue to the inbound queue;

after the I/O command moves to the inbound queue, segment the I/O command based on a sizing parameter to provide multiple I/O command segments; and provide the multiple I/O command segments to the storage media controller.

11. The storage media controller as recited in claim 10, wherein the QoS manager is further configured to determine the credit cost of the I/O command based on metadata or descriptor information of the I/O command.

12. The storage media controller as recited in claim 10, wherein the QoS manager is further configured to implement a queue-based credit policy in which the credit balance associated with the submission queue is managed on a per-queue basis to limit a number of the I/O commands that are fetched from the submission queue and other submission queues of the host based on respective credit balances of the submission queues.

13. The storage media controller as recited in claim 10, wherein the QoS manager is further configured to implement a function-based credit policy in which the credit balance associated with the submission queue is managed on a per-function basis to limit a number of I/O commands that are fetched from the submission queue and other submission queues of the host based on a credit balance of a physical function or a virtual function with which the submission queue and the other submission queues are associated.

14. The storage media controller as recited in claim 10, further comprising a direct memory access (DMA) engine configured to access memory of the host and wherein the QoS manager is further configured to:

provide the multiple I/O command segments to the DMA engine to provide the multiple I/O command segments to the storage media controller for completion; and indicate, to the host, completion of the I/O command in response to the completion of the multiple I/O command segments by the DMA engine.

15. The storage media controller as recited in claim 14, wherein the QoS manager is further configured to:

mark a first of the multiple I/O command segments as an initial I/O command segment of the multiple I/O command segments for the I/O command;

mark a second of the multiple I/O command segments as an intermediate I/O command segment of the multiple I/O command segments for the I/O command; or mark a third of the multiple I/O command segments as a final I/O command segment of the multiple I/O command segments for the I/O command.

16. The storage media controller as recited in claim 10, wherein the QoS manager is further configured to replenish the credit balance of the submission queue in response to completion of the I/O command.

17. The storage media controller as recited in claim 16, wherein the QoS manager replenishes the credit balance of the submission queue with a number of credits equal to the credit cost of the I/O command.

18. An apparatus comprising:

an interface configured to enable access to a submission queue of a host;

an inbound queue configured to store I/O commands for access to storage media associated with the apparatus;

means for maintaining a credit balance of the submission queue;

means for determining that the submission queue holds an I/O command for data access to the storage media;

means for comparing a credit cost for the I/O command with the credit balance of the submission queue; and means for (i) preventing the I/O command from moving from the submission queue to the inbound queue in response to the credit cost of the I/O command exceeding the credit balance of the submission queue or (ii) allowing the I/O command to move from the submission queue to the inbound queue, segmenting the I/O command based on a sizing parameter to provide multiple I/O command segments, and providing the multiple I/O command segments to the storage media in response to the credit cost of the I/O command not exceeding the credit balance of the submission queue.

19. The apparatus as recited in claim 18, further comprising:

means for replenishing the credit balance of the submission queue in response to completion of the I/O command.

20. The apparatus as recited in claim 18, wherein providing the multiple I/O command segments to the storage media comprises providing the multiple I/O command segments to a direct memory access (DMA) engine of the storage media.

* * * * *